United States Patent
Mackenzie (10) Patent No.: US 10,208,704 B2
(45) Date of Patent: Feb. 19, 2019

(54) PISTON COOLING CONFIGURATIONS UTILIZING LUBRICATING OIL FROM A BEARING RESERVOIR IN AN OPPOSED-PISTON ENGINE

(71) Applicant: ACHATES POWER, INC., San Diego, CA (US)

(72) Inventor: Ryan G. Mackenzie, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 15/121,527

(22) PCT Filed: Mar. 5, 2015

(86) PCT No.: PCT/US2015/019028
§ 371 (c)(1),
(2) Date: Aug. 25, 2016

(87) PCT Pub. No.: WO2015/134786
PCT Pub. Date: Sep. 11, 2015

(65) Prior Publication Data
US 2016/0369740 A1    Dec. 22, 2016

Related U.S. Application Data

(63) Continuation-in-part of application No. 14/199,877, filed on Mar. 6, 2014, now Pat. No. 9,470,136.

(51) Int. Cl.
*F01P 1/04* (2006.01)
*F02F 3/22* (2006.01)
(Continued)

(52) U.S. Cl.
CPC .................. *F02F 3/22* (2013.01); *F01B 7/02* (2013.01); *F01M 1/06* (2013.01); *F01M 1/08* (2013.01);
(Continued)

(58) Field of Classification Search
CPC ....... F02F 3/20; F01M 2001/066; F01M 1/06; F01M 1/08; F01M 2001/086; F02B 75/28
(Continued)

(56) References Cited

U.S. PATENT DOCUMENTS

| 1,207,799 A | 12/1916 | Scheller | 123/51 B |
| 1,523,453 A | 1/1925 | Scott | 123/51 B |

(Continued)

FOREIGN PATENT DOCUMENTS

| BE | 388676 A | 6/1932 |
| CN | 1077214 C | 1/2002 |

(Continued)

OTHER PUBLICATIONS

Booker, et al., "Dynamic Analysis of Rocking Journal Bearings With Multiple Offset Segments", Transactions of the ASME, vol. 104, Oct. 1982, pp. 478-490.
(Continued)

*Primary Examiner* — Marguerite McMahon
*Assistant Examiner* — James Kim
(74) *Attorney, Agent, or Firm* — Terrance A. Meador (57) ABSTRACT

Pressurized lubricating oil is accumulated in the bearings of opposed pistons and accumulated oil is dispensed therefrom for bearing lubrication and also for cooling the undercrowns of the pistons by jets of oil emitted from the bearings.

6 Claims, 8 Drawing Sheets

(51) Int. Cl.

| | |
|---|---|
| *F01P 3/08* | (2006.01) |
| *F01B 7/02* | (2006.01) |
| *F01M 1/08* | (2006.01) |
| *F01M 1/06* | (2006.01) |
| *F16J 1/16* | (2006.01) |
| *F02B 25/08* | (2006.01) |
| *F02B 75/28* | (2006.01) |
| *F02F 3/26* | (2006.01) |
| *F16C 9/04* | (2006.01) |

(52) U.S. Cl.
CPC ............... *F01P 3/08* (2013.01); *F02B 25/08* (2013.01); *F02B 75/28* (2013.01); *F02B 75/282* (2013.01); *F02F 3/225* (2013.01); *F02F 3/26* (2013.01); *F16C 9/04* (2013.01); *F16J 1/16* (2013.01); *F01M 2001/066* (2013.01)

(58) Field of Classification Search
USPC .......... 123/193.6, 196 R, 41.35, 41.38, 48 B
See application file for complete search history.

(56) References Cited

U.S. PATENT DOCUMENTS

| | | | | |
|---|---|---|---|---|
| 1,603,173 | A | 10/1926 | Watts | 123/196 R |
| 1,623,704 | A | 4/1927 | Philip | 123/51 B |
| 1,680,017 | A | 8/1928 | Fornaca | 123/51 |
| 1,899,355 | A | 2/1933 | Reid | 403/230 |
| 2,048,002 | A * | 7/1936 | Frelin | F02F 3/22 123/41.38 |
| 2,236,401 | A | 3/1941 | Gehres | 123/41.38 |
| 2,282,085 | A | 5/1942 | Nichols | 123/41.38 |
| 2,369,500 | A | 2/1945 | Wacber | 123/176 |
| 2,369,906 | A * | 2/1945 | Moore | F02F 3/22 123/41.38 |
| 2,409,057 | A | 10/1946 | Meinke | 92/140 |
| 2,757,990 | A | 8/1956 | Barlow | 308/78 |
| 2,807,247 | A * | 9/1957 | Cramer, Jr. | F01P 3/10 123/41.38 |
| 2,853,983 | A | 9/1958 | Sawle, Jr. | 123/51 |
| 2,991,769 | A * | 7/1961 | Chapin | F01P 3/08 123/41.35 |
| 3,023,743 | A | 3/1962 | Schauer, Jr. | 123/51 BA |
| 3,131,785 | A | 5/1964 | Blank | 184/6 |
| 3,221,718 | A | 12/1965 | Isley | 123/41.35 |
| 3,361,007 | A * | 1/1968 | Belsanti | F01M 1/06 184/6.8 |
| 3,380,789 | A | 4/1968 | Nigh | |
| 3,480,113 | A | 11/1969 | Pope et al. | 184/6.5 |
| 3,495,685 | A | 2/1970 | Rinsum | 384/288 |
| 3,762,389 | A | 10/1973 | Malina | 123/197 |
| 3,983,793 | A | 10/1976 | Beardmore | 92/190 |
| 3,992,980 | A | 11/1976 | Ryan et al. | 92/157 |
| 4,010,718 | A | 3/1977 | Steward | 123/41.35 |
| 4,175,502 | A | 11/1979 | Moebus | 123/41.35 |
| 4,204,487 | A | 5/1980 | Jones | 123/41.35 |
| 4,363,293 | A * | 12/1982 | Munoz | F01P 3/10 123/41.37 |
| 4,466,387 | A | 8/1984 | Perry | 123/41.37 |
| 4,515,110 | A | 5/1985 | Perry | 123/451.37 |
| 4,662,319 | A * | 5/1987 | Ayoul | F02F 3/0015 123/193.6 |
| 4,864,977 | A * | 9/1989 | Hasegawa | F02B 75/044 123/48 B |
| 4,984,544 | A | 1/1991 | DeBiasse | 123/197 |
| 5,046,930 | A * | 9/1991 | Lindstrom | F04B 39/0246 184/6.18 |
| 5,058,537 | A | 10/1991 | Paul et al. | 123/51 |
| 5,533,472 | A | 7/1996 | Sands et al. | 123/41.35 |
| 5,806,631 | A * | 9/1998 | Yoshida | F01M 1/08 123/196 R |
| 5,915,345 | A | 6/1999 | Kling et al. | 123/41.35 |
| 6,120,189 | A | 9/2000 | Beagle et al. | 384/429 |
| 6,273,051 | B1 * | 8/2001 | Paty | F01M 1/06 123/196 R |
| 6,334,385 | B1 * | 1/2002 | Wilksch | F02F 3/22 92/159 |
| 6,481,389 | B2 | 11/2002 | Suzuki et al. | 123/41.35 |
| 6,609,405 | B1 | 8/2003 | Murglin | 123/41.35 |
| 6,609,485 | B2 | 8/2003 | Murglin | 123/41.35 |
| 7,051,684 | B2 * | 5/2006 | Bauer | F02F 3/22 123/41.35 |
| 7,156,056 | B2 | 1/2007 | Lemke et al. | 123/41.35 |
| 7,201,118 | B2 * | 4/2007 | Lenz | F01M 1/08 123/196 R |
| 7,305,960 | B2 | 12/2007 | Zvonkovic | 123/193.6 |
| 7,322,318 | B2 | 1/2008 | Nagahashi et al. | 123/41.35 |
| 7,360,511 | B2 | 4/2008 | Lemke et al. | 123/41.35 |
| 7,753,024 | B2 | 7/2010 | Hausler et al. | |
| 8,267,005 | B2 | 9/2012 | Scharp et al. | 92/186 |
| 8,430,070 | B2 | 4/2013 | Rebell | 123/41.35 |
| 8,539,918 | B2 | 9/2013 | Lemke et al. | 123/52.2 |
| 8,631,736 | B2 | 1/2014 | Kortas et al. | 92/223 |
| 8,800,528 | B2 | 8/2014 | Fuqua et al. | 123/301 |
| 9,163,505 | B2 * | 10/2015 | Dion | F01B 7/08 |
| 9,512,779 | B2 | 12/2016 | Redon | 123/295 |
| 2005/0274332 | A1 | 12/2005 | Lemke et al. | 123/41.35 |
| 2006/0157003 | A1 | 7/2006 | Lemke et al. | 123/41.38 |
| 2007/0039572 | A1 | 2/2007 | Lemke et al. | 123/51 |
| 2007/0245892 | A1 | 10/2007 | Lemke et al. | 92/169.1 |
| 2008/0163848 | A1 | 7/2008 | Lemke et al. | 123/197.3 |
| 2008/0295683 | A1 * | 12/2008 | Wagner | F01P 3/08 92/186 |
| 2008/0314688 | A1 | 12/2008 | Lemke et al. | 184/6.8 |
| 2009/0145394 | A1 | 6/2009 | Nigro | 123/193.6 |
| 2010/0012055 | A1 | 1/2010 | Lemke et al. | 123/41.35 |
| 2010/0107868 | A1 | 5/2010 | Scharp et al. | 92/159 |
| 2010/0212613 | A1 | 8/2010 | Lemke et al. | 123/52.2 |
| 2010/0224162 | A1 | 9/2010 | Hofbauer | 123/196 R |
| 2010/0258064 | A1 * | 10/2010 | Rebello | F02F 3/003 123/41.35 |
| 2011/0041684 | A1 | 2/2011 | Kortas et al. | 92/255 |
| 2011/0271932 | A1 | 11/2011 | Fuqua et al. | 123/301 |
| 2012/0073526 | A1 | 3/2012 | Dion et al. | 123/41.44 |
| 2012/0073538 | A1 | 3/2012 | Hofbauer | 123/197.4 |
| 2013/0213341 | A1 | 8/2013 | Burton et al. | 123/301 |
| 2014/0014063 | A1 | 1/2014 | Redon | 123/295 |
| 2014/0238360 | A1 * | 8/2014 | Dion | F16J 1/09 123/51 B |

FOREIGN PATENT DOCUMENTS

| | | |
|---|---|---|
| CN | 2542841 Y | 4/2003 |
| CN | 102705101 A | 10/2012 |
| CN | 103097686 A | 5/2013 |
| DE | 19547186 C1 | 12/1996 |
| DE | 4243571 A1 | 5/1997 |
| DE | 19910092 A1 | 9/2000 |
| DE | 19962325 A1 | 9/2003 |
| DE | 10-2006-055-251 A1 | 5/2008 |
| DE | 10-2008-055-911 A1 | 5/2010 |
| EP | 0747591 A1 | 8/1999 |
| JP | S56-132414 A | 10/1981 |
| JP | S58-109537 U | 7/1983 |
| JP | H03-77052 U | 8/1991 |
| JP | 2000-054816 A | 2/2000 |
| JP | 2005-127227 A | 5/2005 |
| JP | 2005-331056 A | 12/2005 |
| SU | 1216394 A | 3/1986 |
| WO | WO-2005/103456 A2 | 11/2005 |
| WO | WO-2005/124124 A1 | 12/2005 |
| WO | WO-2012/023970 A2 | 2/2012 |
| WO | WO-2012/158756 A1 | 11/2012 |
| WO | WO-2013/170593 A1 | 11/2013 |
| WO | WO-2014/130969 A1 | 8/2014 |

(56) References Cited

OTHER PUBLICATIONS

J.F. Butler, E.P. Crowdy, The Doxford Seahorse Engine, paper presented at a joint meeting of the Institute and N.E.C.I.E.S. on Nov. 8-9, 1971, pp. 73-115.
English Translation of First Office Action issued by the State Intellectual Property Office of PRC in PRC application 200580023840.9, dated Jul. 25, 2008.
Fairbanks Morse Meeting Notes re "Meeting between Glacier-Clevite and Fairbanks Morse", Jun. 5, 1992.
Glacier-Clevite Inter-Office Memorandum re "Rocking Pin Bushing Design", Feb. 17, 1992.
W.E. Napel, R. Bosma, M. Akker, Lubrication of the small end bearings in supercharged two-stroke diesel engines, Tribology of Reciprocating Engines: Proceedings 9th Leeds-Lyons Symposium on Tribology, 1982, pp. 37-46.
Napier Nomad: An Engine of Outstanding Efficiency, Flight, Apr. 30, 1954, pp. 543-551.
H. Sammons, E. Chatterton, Napier Nomad Aircraft Diesel Engine, SAE Transactions, vol. 63, 1955, pp. 107-131.
Wakuri et al., "On the Lubrication of Crosshead-pin Bearing with Eccentric Journal", Bulletin of the JSME, vol. 25, No. 206, Aug. 1982, Paper No. 206-17, p. 1312-1320.
International Search Report and Written Opinion dated Mar. 12, 2012, for corresponding PCT Application No. PCT/US2011/001429.
International Search Report and Written Opinion dated Jul. 10, 2014, for corresponding PCT Application No. PCT/US2014/018108.
International Search Report and Written Opinion dated Jan. 28, 2015, for corresponding PCT Application No. PCT/US2014/060414.
National Advisory Committee for Aeronautics, Report No. 895, Sanders, J.C. and Schramm, W.B., "Analysis of variation of piston temperature with piston dimensions and undercrown cooling", pp. 89-98 (Jan. 15, 1948).
International Search Report and Written Opinion dated May 13, 2015, for corresponding PCT Application No. PCT/US2015/019028.
Achates Power, "Achates Power Opposed-Piston Engine Animation", YouTube, <https://www.youtube.com/watch?v=_QTfvIfsjJw>.
Notification of First Office Action dated Jul. 10, 2018, for Chinese Patent Application No. 2015800118025.

* cited by examiner

PISTON COOLING CONFIGURATIONS UTILIZING LUBRICATING OIL FROM A BEARING RESERVOIR IN AN OPPOSED-PISTON ENGINE

PRIORITY

This application is a U.S. national phase application filed under 35 U.S.C. 371 of international application no. PCT/US2015/019028, filed on 5 Mar. 2015, which is a continuation-in-part of and claims priority to, U.S. application Ser. No. 14/199,877, filed on 6 Mar. 2014.

RELATED APPLICATIONS

This application contains subject matter related to the subject matter of US 2012/0073526 A1 and US publication 2014/0238360 A1.

FIELD

The field is piston thermal management for internal combustion engines. More specifically the application relates to implementation of a piston cooling configuration for an opposed-piston engine in which the undercrown—that portion of the piston crown that is behind or underneath the crown end surface against which combustion acts—is cooled by use of one or more jets of lubricating oil fed from a reservoir in the piston's bearing mechanism.

BACKGROUND

Piston thermal management presents continuing challenges to piston integrity due to increasing loads demanded for modern engines. In a typical piston, four areas are particularly susceptible to thermal damage: the piston crown, the ring grooves, the piston/wristpin interface, and the piston undercrown. If combustion temperatures felt by the crown end surface exceed the oxidation temperature of the crown materials, oxidation can result. The crown may be subject to mechanical failure caused by stress/fatigue at the oxidized sites. The piston's rings, ring grooves, and lands may exhibit carbon build-up due to lubricating oil being heated above its coking temperature. A hot wristpin bore can result in lower load-carrying capacity of the piston bearing. As with the ring grooves, the piston undercrown may also be subject to oil coking.

In some aspects of opposed-piston combustion chamber construction it is desirable to utilize pistons whose crowns include highly contoured end surfaces which produce complex, turbulent charge air motion that encourages uniform mixing of air and fuel. An example of a highly contoured piston end surface that forms a combustion chamber with an oppositely-disposed, similarly-contoured piston end surface is shown in FIG. 11 of US 2011/0271932 A1. Combustion imposes a heavy thermal load on these pistons. Their highly contoured end surfaces create non-uniform thermal profiles with concentrations of heat ("hot spots") that can lead to asymmetrical thermal stress, wear, and piston fracture.

Typically, three approaches are taken to manage piston temperatures. In one, high thermal resistance of the piston crown reduces or blocks the passage of heat from the combustion chamber into the crown. A second approach relies on conduction of heat from the crown to the cylinder bore through the rings, ring grooves, lands, and skirt of the piston. The third approach uses a flow of liquid coolant to remove heat from the undercrown. Modern piston constructions typically include all three approaches.

Liquid coolant is typically applied to the undercrown by means of galleries and/or nozzles. For example, U.S. Pat. No. 8,430,070 teaches a piston cooling construction including an outer gallery that receives and transports oil for cooling the piston undercrown. An oil outlet is provided on the bottom of the outer gallery. A nozzle mounted to the floor of the outer gallery, in fluid communication with the oil outlet is aimed toward the undercrown. Oil is inertially pumped from the gallery through the oil outlet in response to upward movement of the piston. The pumped oil is sprayed from the nozzle onto the undercrown in response to upward movement of the piston.

An example of undercrown cooling in an opposed-piston context is shown in FIG. 5 of the Applicant's US 2012/0073526 A1 wherein a piston with a contoured end surface includes an annular gallery 256 within the crown that follows the periphery of the crown, underneath the end surface. The annular gallery is in fluid communication with a central gallery 257 underneath the central portion of the end surface. A nozzle 262, separate from the piston, is aimed at an opening in the annular gallery 256. A high velocity jet of oil emitted by the nozzle 262 travels into the annular gallery, striking a specific portion of the crown underneath a ridge of the end surface that bears a heavy thermal burden during combustion. The jet cools the specific crown portion by impingement. The oil then flows through the annular and central galleries, thereby cooling additional portions of the undercrown. Oil flows out of the central gallery and exits the piston.

The cooling capability of the nozzle described in U.S. Pat. No. 8,430,070 is limited by the inertial pumping operation which occurs only during upward movement of the piston. As a result, the undercrown is cooled by spraying oil through only one half of the piston's operational cycle. Furthermore, because the sprayed oil is obtained from the cooling gallery, it is already heated, which limits its cooling capacity when emitted by the nozzle. The cooling construction of US 2012/0073526 A1 brings oil into the piston via a nozzle external to the piston. Separate transport channels are required to bring up pressurized oil to cool the undercrown and to lubricate the piston rod coupling mechanism. As a result, oil is provided throughout the operating cycle of the piston, but at the penalty of increased complexity and cost of the lubrication system.

Accordingly, there is a need for delivering lubricating oil to a piston for cooling the undercrown in a manner that maintains the flow of lubricating oil throughout the piston's cycle of operation without adding to the complexity and cost of the system that transports the oil to the piston for lubrication.

SUMMARY

In order to cool the undercrown of a piston with pressurized lubricating oil throughout the piston's cycle of operation, without adding to the complexity and cost of the system that transports the oil to the piston for lubrication, oil is pumped to a reservoir in the piston's bearing for lubricating the bearing. From the reservoir, the pressurized oil is also provided to one or more cooling jet outlets provided in the bearing and aimed at the undercrown.

In some aspects, the reservoir is in the wristpin of the piston bearing. In some further aspects, the reservoir is in a piston bearing wristpin attached to the small end of a connecting rod.

In some aspects, a stationary cooling jet outlet in fluid communication with a bearing oil reservoir is positioned to emit a jet of oil targeted at a specific, large region of a piston undercrown. The stationary cooling jet outlet may be disposed in a bearing part that does not move relative to the undercrown. In some aspects, the bearing part supports the wristpin for oscillating movement with respect to the undercrown during engine operation.

In some aspects, a cooling jet outlet includes a movable nozzle in fluid communication with a bearing oil reservoir. The nozzle is positioned to emit a jet of oil targeted to a specific, large region of a piston undercrown. The nozzle may be mounted to a piston part that moves relative to the undercrown as the piston travels so as to sweep the region with the jet. In some other aspects, the part oscillates within the piston skirt in response to piston movement so that the jet continuously sweeps the region with each cycle of piston movement. In yet other aspects, the nozzle is mounted to an element of the connecting rod that oscillates, or rocks, with respect to the undercrown during engine operation.

In further aspects, a cooling jet outlet includes a passage drilled or formed in a bearing support member that includes a bearing surface that receives and supports the wristpin for oscillating movement.

DETAILED DESCRIPTION

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder. During engine operation, combustion takes place in a combustion chamber formed between the end surfaces of the pistons.

Figure 1:
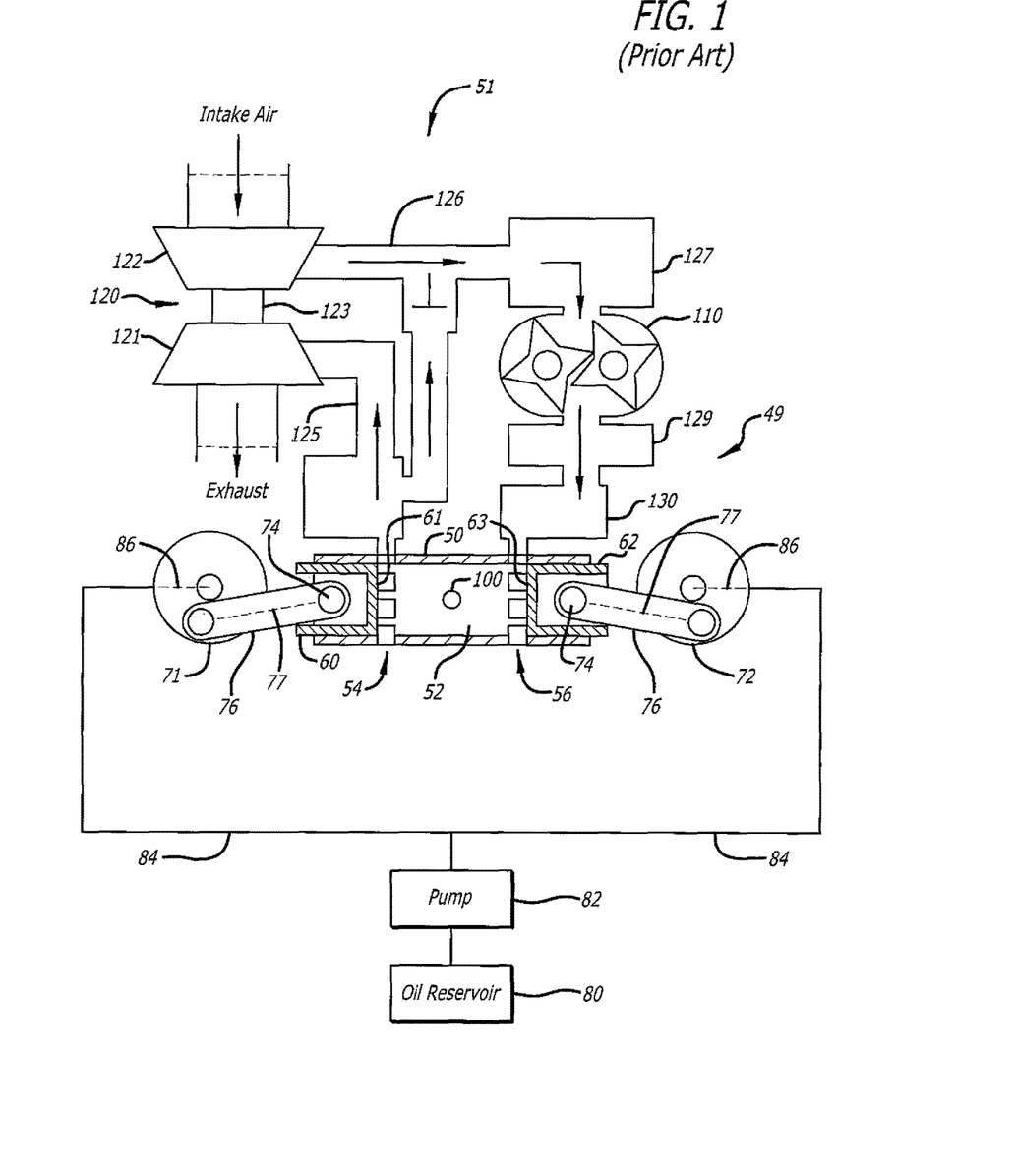
FIG. 1 is a schematic drawing of a prior art opposed-piston engine with a pump-supplied oil gallery.

As seen in FIG. 1, an opposed-piston engine 49 has at least one ported cylinder 50. For example, the engine may have one ported cylinder, two ported cylinders, three ported cylinders, or four or more ported cylinders. For purposes of illustration, the engine 49 is presumed to have a plurality of ported cylinders. Each cylinder 50 has a bore 52. Exhaust and intake ports 54 and 56 are formed in respective ends of the cylinder such that the exhaust port 54 is longitudinally separated from the intake port 56. Each of the exhaust and intake ports 54 and 56 includes one or more circumferential arrays of openings. Exhaust and intake pistons 60 and 62 are slidably disposed in the bore 52 with their end surfaces 61 and 63 opposing one another. The exhaust pistons 60 are coupled to a crankshaft 71, and the intake pistons 62 are coupled to a crankshaft 72. Each of the pistons is coupled to its associated crankshaft by a bearing 74 and a connecting rod 76.

A lubrication system that supplies oil to lubricate the moving parts of the engine 49 includes an oil reservoir 80 from which pressurized oil is pumped by a pump 82 to a main gallery 84. The main gallery supplies pressurized oil to the crankshafts 71 and 72, typically through drillings 86 to the main bearings (not seen). From grooves in the main bearings, pressurized oil is provided to grooves in the big end bearings of the connecting rods 76. From there, pressurized oil flows through drillings 77 in the connecting rods to the bearings 74.

In some aspects, which are not intended to be limiting, the engine 49 is equipped with an air management system 51 that includes a supercharger 110 and a turbocharger 120. The turbocharger has a turbine 121 and a compressor 122 rotating on a common shaft 123. The turbine 121 is coupled to the exhaust subsystem and the compressor 122 is coupled to the charge air subsystem. Exhaust gas emptied into the conduit 125 from the exhaust port 54 rotate the turbine 121. This rotates the compressor 122, causing it to generate charge air by compressing intake air. The charge air output by the compressor 122 flows through a conduit 126, whence it is pumped by the supercharger 110 to the openings of the intake port 56.

The operational cycle of an opposed-piston engine is well understood. In response to combustion occurring between their end surfaces 61, 63, the opposed pistons 60, 62 move away from respective top center (TC) locations in the cylinder. While moving from TC, the pistons keep their associated ports closed until they approach respective bottom center (BC) positions. The pistons may move in phase so that the exhaust and intake ports 54, 56 open and close in unison; alternatively, one piston may lead the other in phase, in which case the intake and exhaust ports have different opening and closing times. As the pistons move through their BC locations exhaust products flowing out of the exhaust port 54 are replaced by charge air flowing into the cylinder through the intake port 56. After reaching BC, the pistons reverse direction and the ports are again closed by the pistons. While the pistons continue moving toward TC, the charge air in the cylinder 50 is compressed between the end surfaces 61 and 63. As the pistons advance to their respective TC locations in the cylinder bore, fuel is injected through the nozzles 100 into the charge air, and the mixture of charge air and fuel is compressed in the combustion chamber formed between the end surfaces 61 and 63 of the pistons 60 and 62. When the mixture reaches an ignition temperature, the fuel ignites. Combustion results, driving the pistons apart, toward their respective BC locations.

In some cases, the opposing end surfaces 61 and 63 are identically constructed and the pistons 60 and 62 are disposed in rotational opposition with reference to the axis of the cylinder in which they are disposed. See, for example, the piston end surface constructions described and illustrated in the Applicant's US publication 2011/0271932 A1 and US publication 2013/0213342 A1. In some other cases, the opposing end surfaces 61 and 63 have complementary constructions which do not require rotational opposition. See, for example, the piston end surface constructions described and illustrated in the Applicant's WO publication 2012/158756 A1 and related U.S. application Ser. No. 14/026,931.

It is desirable to include undercrown cooling in the thermal design of the pistons of an opposed-piston engine such as the engine 49 shown in FIG. 1. Therefore, the undercrown cooling embodiments described and illustrated in this specification may be combined with other modes of piston thermal management in order to realize an effective piston thermal performance. Undercrown cooling and other objectives are achieved by accumulating pressurized lubricating oil in the piston bearings of an opposed-piston engine and dispensing accumulated oil therefrom for bearing lubrication and also for cooling the undercrowns of the pistons by way of one or more jets.

First End Surface Construction

Figure 2:
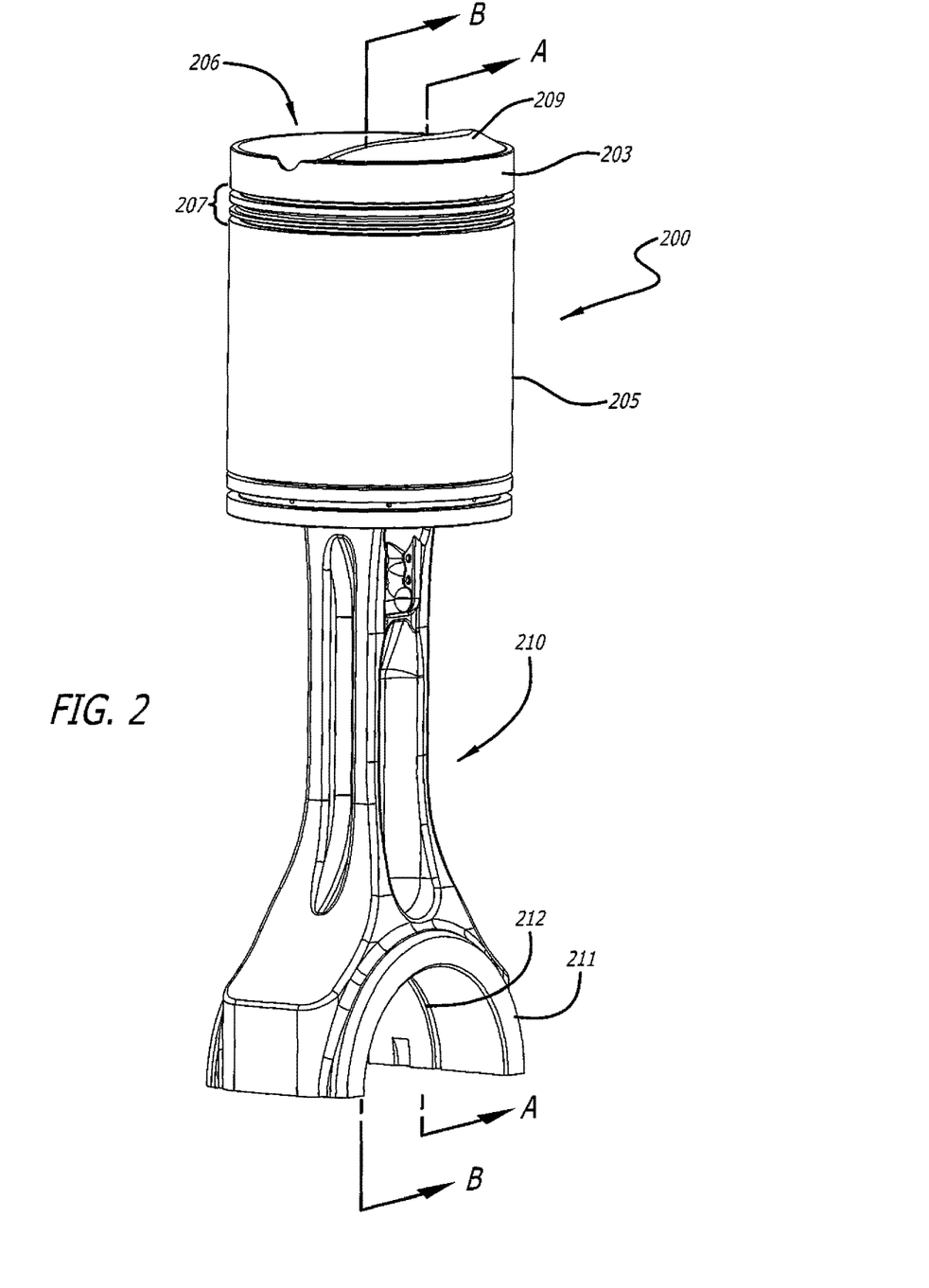
FIG. 2 is a side view, in perspective, of a piston/connecting rod assembly for a two-stroke cycle, opposed-piston engine in which the piston has a first end surface construction.
Figure 3:
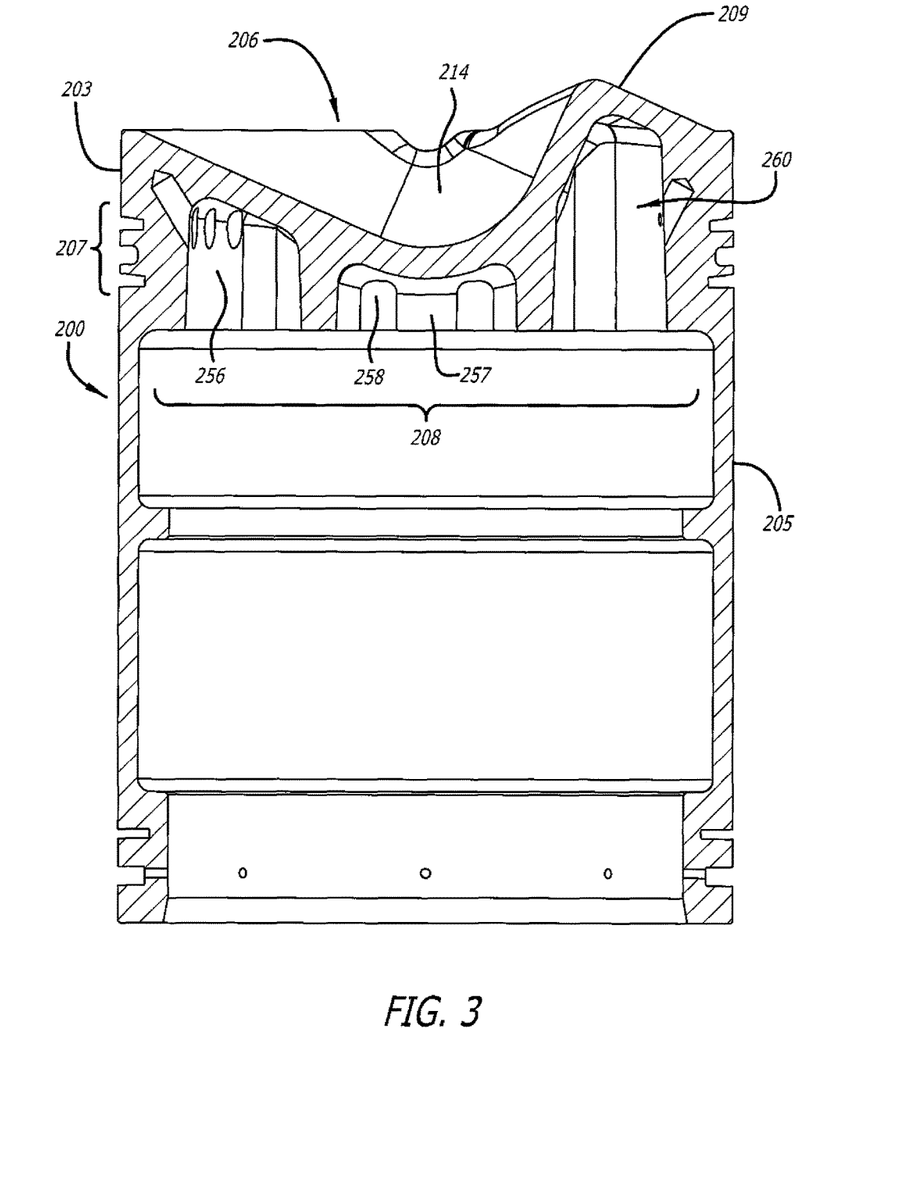
FIG. 3 is a cross-sectional view of the piston crown and skirt taken along lines A-A of FIG. 2.
Figure 4:
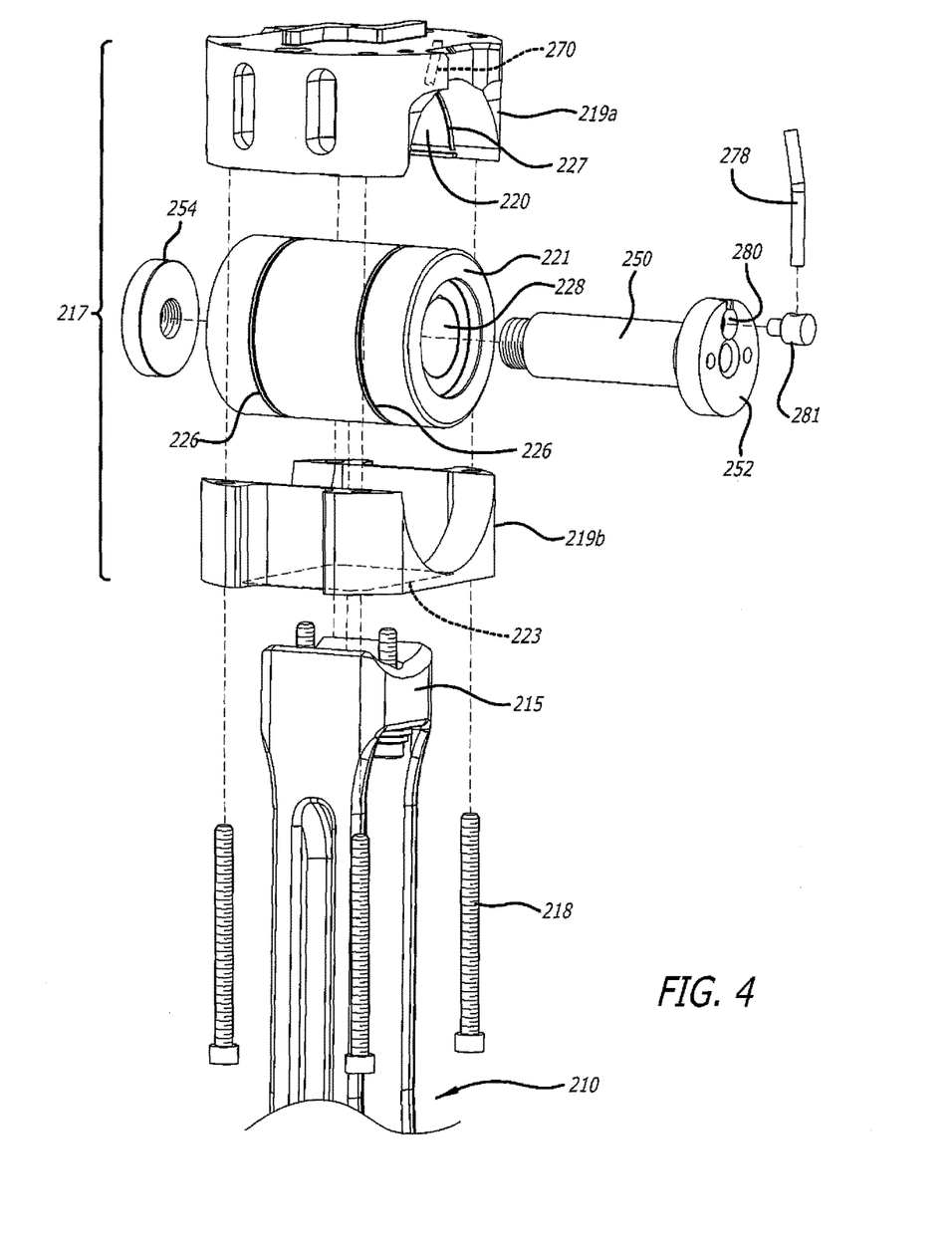
FIG. 4 is an exploded view of the piston/connecting rod assembly of FIG. 2 showing elements of a bearing configuration.

FIG. 2 is a perspective view of a piston assembly used in an opposed-piston engine in which the pistons have identical end surfaces. In this case the description is directed to a single piston, with the understanding that it applies as well to its opposing counterpart. The piston assembly includes a piston 200 and its associated connecting rod 210. The piston 200 has a crown 203, and a skirt 205. An end surface 206 of the crown is configured to form a combustion chamber in cooperation with the end surface of an identically-configured, opposing piston. Lands and ring grooves 207 are provided in the crown's side wall. Referring to FIGS. 2, 3, and 4, the piston includes an undercrown 208, which is that portion of the piston crown 203 that is behind or underneath the end surface 206 against which combustion acts. The connecting rod 210 has a large end 211 for coupling to a crank throw of a crankshaft (not seen). An oil groove 212 is formed in the bearing surface of the large end 211. An oil delivery passage 213 (best seen in FIG. 5B) extends longitudinally in the connecting rod 210 from the oil groove 212 to the small end 215.

As per FIGS. 2 and 3, the contour of the end surface 206 includes a ridge 209 formed by complex curved surfaces including a bowl 214 that interact with bulk air motion components to enhance charge air turbulence in the combustion chamber. During combustion, one or more hot spots may occur in portions of the crown including the ridge 209 and/or the bowl 214.

Piston Bearing Construction and Lubrication

Figure 5A:
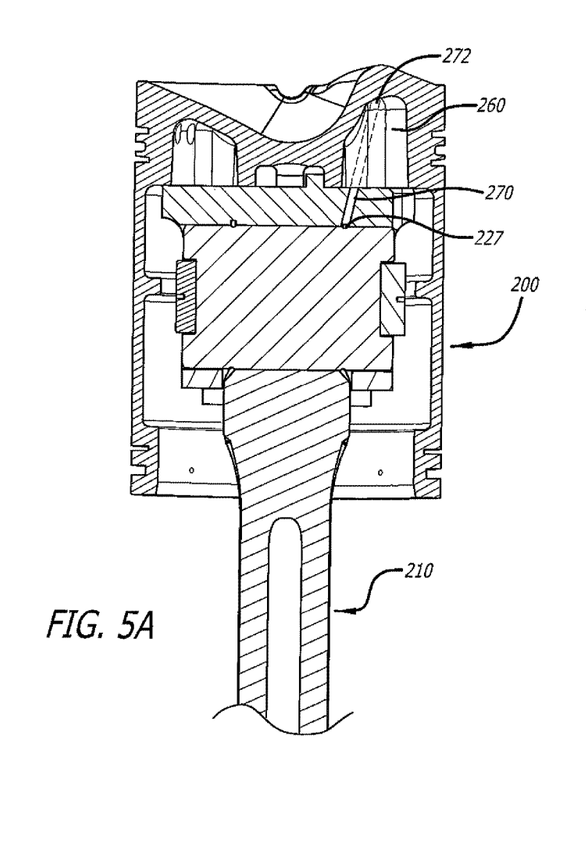
FIG. 5A is a cross-sectional view of the piston/connecting rod assembly taken along lines A-A of FIG. 2 showing a first cooling jet outlet construction.
Figure 5B:
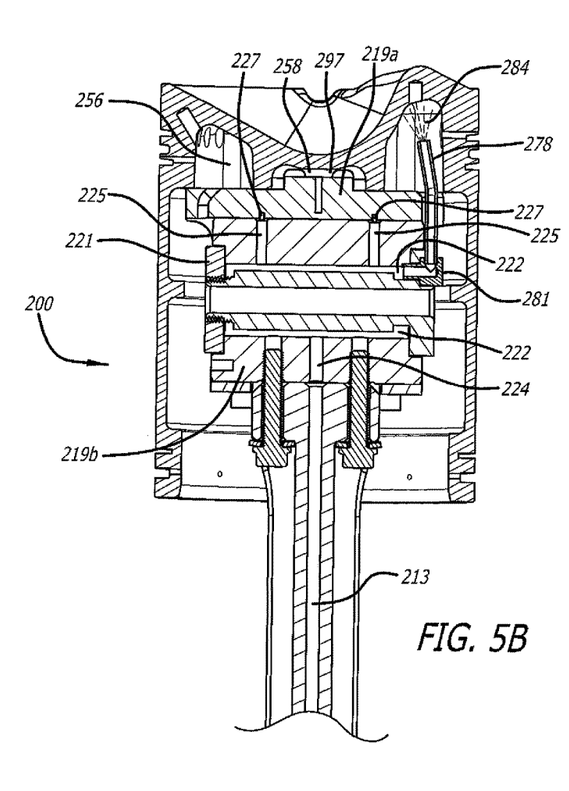
FIG. 5B is a cross-sectional view of the piston/connecting rod assembly taken along lines B-B of FIG. 2 showing a second cooling jet outlet construction.

With reference to FIGS. 4, 5A, and 5B, the piston 200 includes a bearing 217 fixed to the undercrown 208 and disposed in space encircled by the skirt 205. As per FIGS. 4 and 5B, a bearing structure includes bearing support members 219a and 219b. The bearing support member 219a includes a bearing surface 220 that receives a wristpin 221 (also called a "journal" or a "gudgeon pin") mounted to the small end 215 by threaded fasteners. In some instances, the bearing support members 219a and 219b are joined around the wristpin 221 and secured to the undercrown by fasteners 218 that are threadably seated in interior structures of the undercrown 208. As seen in FIG. 4, an opening 223 in the bearing support member 219b receives the connecting rod 210. When assembled, the bearing support member 219a, 219b retains the wristpin 221 for oscillation on the bearing surface 220 caused by arcuate oscillation of the connecting rod 210 in the opening 223.

As per FIGS. 4 and 5B, the wristpin 221 includes an internal oil reservoir 222 in fluid communication with an oil inlet passage 224 drilled through the wristpin 221 and one or more oil outlet passages 225 drilled through the wristpin 221. Circumferential oiling grooves 227 are formed in the bearing surface 220 in alignment and fluid communication with the oil outlet passages 225. In some aspects, best seen in FIG. 4, the oil reservoir 222 can be configured as an annular recess with opposing ends and an axis that corresponds to the axis on which the wristpin 221 oscillates. In this case, a cylindrical shaft 250 is received in the cylindrical inner surface 228 of the wristpin 221. A flange 252 is fixed to one end of the shaft 250; the opposite end of the shaft is threaded to another flange 254 so as to retain the shaft 250 in coaxial alignment with the cylindrical inner surface 228 of the wristpin 221. As the views in FIGS. 4 and 5B show, the smaller diameter of the shaft 250 results in the formation of an annular space between itself and the inner surface 228. In other instances the oil reservoir may be formed by a capped or stoppered drilling in the wristpin 221.

With reference to FIG. 5B, pressurized oil is transported to the large end oil groove 212 in the manner illustrated by the transport path 80, 82, 84, 86 in FIG. 1. From the oil groove 212, pressurized oil is delivered to the oil reservoir 222 via the oil reservoir inlet passage 224. Pressurized oil received in the oil reservoir 222 is provided in multiple streams through the outlet passages 225 to the oiling grooves 227 whence it flows to lubricate the bearing interface between the bearing surface 220 and the wristpin 221.

In some aspects, but not necessarily, the bearing 217 may be constructed as a rocking journal bearing (also called a "biaxial" bearing). Such a bearing is described in the Applicant's U.S. patent application Ser. No. 13/776,656. In this case the bearing surface 220 comprises a plurality of axially-spaced, eccentrically-disposed surface segments and the wristpin 221 includes a corresponding plurality of axially-spaced, eccentrically-disposed wristpin segments. In such cases, the bearing surface 220 may have a semi-cylindrical configuration with two lateral surface segments sharing a first centerline and a central surface segment separating the two lateral surface segments and having a second centerline offset from the first centerline. In such cases, the circumferential oiling grooves 227 are formed in the bearing surface 220 at the borders between the central surface segment and the lateral surface segments. In some instances, the outer surface of the wristpin 221 may have axially-spaced circumferential grooves 226 (best seen in FIG. 4) and one or more circumferentially-spaced axial oiling grooves (not seen) may also be formed in the bearing surface 220 to enhance the lubrication of the bearing interface.

Gallery Cooling

As best seen in FIGS. 3, 4 and 5A, the undercrown 208 is cooled by flow of lubricating oil through one or more galleries internal to the crown 203. Preferably, the galleries comprise shaped spaces in the undercrown 208 with floors provided on the upper surface of the bearing support member 219a. For example, an annular gallery 256 follows the periphery of the crown 203 and girds a central gallery 257. The annular gallery 256 communicates with the central gallery 257 through holes 258. The annular gallery 256 has an asymmetric profile that rises as at 260 under the ridge 209. The central gallery 257 abuts the deepest part of the end surface 206. Lubricating oil for cooling the undercrown is provided to the galleries via a high velocity jet of pressurized oil. The jet strikes the interior surface of the annular gallery at its highest point 260, thereby cooling that portion of the undercrown 208 beneath the ridge 209 by impingement. The oil carried by the jet flows from there throughout the annular gallery 256. From the annular gallery 256, the lubricating oil flows into the central gallery 257 where it continuously irrigates the central portion of the undercrown along the inside of the ridge 209. Lubricating oil flowing throughout the annular gallery 256 washes and cools an annular portion of the undercrown 208 that abuts the lands and ring grooves 207. Reciprocation of the piston agitates the oil, which causes it to circulate in the annular gallery 256. In response to the agitation and piston motion, oil also flows from the annular gallery 256 into the central gallery 257. Piston reciprocation also agitates the oil collected or accumulated in the central gallery 257 so as to cool the undercrown 208 beneath the central portion of the end surface 206. The oil flows from the bottom of central gallery 257 via one or more passages in the bearing structure into the interior of the skirt 205. From there, the oil flows out the open end of the skirt 205.

In the prior art gallery cooling constructions described in the Applicant's US 2012/0073526 A1, the lubricating oil jets for cooling the undercrown are provided to the piston galleries from nozzles that are separate from, external to, and fixed with respect to, the pistons. In the embodiments to be described, the oil jets are delivered from elements of the pistons themselves and are fed from oil reservoirs in the piston bearings.

Cooling Jet Constructions

With regard to the piston lubrication constructions thus far described, the pressurized oil delivered to a bearing oil reservoir for lubrication may at the same time be used for undercrown cooling in an opposed-piston engine. In some aspects, pressurized oil obtained from a bearing oil reservoir is provided in the form of a high velocity stream or jet for cooling a piston undercrown. Hereinafter such a jet is referred to as a "cooling jet", for convenience and clarity. A cooling jet is provided from a cooling jet outlet that is in fluid communication with the bearing oil reservoir. At least one cooling jet constituted of received, pressurized lubricating oil is provided from each piston bearing so as to cool a portion of the undercrown by impingement. Jetted oil flows from the undercrown portion into the piston cooling galleries so as to provide a constant replenishment of coolant with which to cool the rest of the undercrown by irrigation. A cooling jet may be stationary, or it may be swept in an oscillating motion.

FIGS. 4, 5A, and 5B illustrate two cooling jet embodiments. Although both embodiments are shown together in one or more of the figures, this is for convenience and clarity. In fact the embodiments are proposed as alternatives. That is to say a piston may be equipped with one or the other, as required by design considerations and cost.

First Embodiment

Continuing with the exemplary piston construction shown in FIGS. 4 and 5A, a first cooling jet outlet embodiment is constituted of a passage 270 drilled or formed in the bearing support member 219a. One end of the passage 270 is in fluid communication with the oil reservoir 222 via an oiling groove 227. When pressurized oil received in the reservoir enters the oiling grooves 227, a portion of it flows into the passage 270 whence it is emitted in the form of a coolant jet 272. The passage 270 is located and oriented so as to be aimed at the undercrown portion 260. As a result, the coolant jet 272 is directed toward the hot spot in the crown 203 that is associated with the ridge 209. As should be evident with regard to the figures, the bearing support member 219a is fixed to the undercrown. Lacking relative movement between the member 219a and the undercrown 208, the jet 272 is stationary with respect to the undercrown 208.

Second Embodiment

An alternative coolant jet outlet is best seen in FIGS. 4 and 5B, where a nozzle 278 is mounted to the wristpin 221 so as to be in fluid communication with the reservoir 222 by way of an oil outlet 280. In the illustrated example, the oil outlet 280 is formed in the flange 252, and the nozzle 278 is mounted thereto by an elbow joint 281 received in the oil outlet. The nozzle 278 extends into the annular gallery 256, aimed toward the undercrown portion 260. Pressurized oil received in the reservoir 222 flows into the nozzle through the oil outlet 280 and the elbow joint 281. From the nozzle 278, the pressurized oil is emitted in the form of a coolant jet 284. As should be evident with regard to the figures, the wristpin 221 undergoes oscillatory movement relative to the undercrown 208. As a result, the coolant jet 284 is swept to and fro across the undercrown portion 260.

Second Piston Construction

Figure 6:
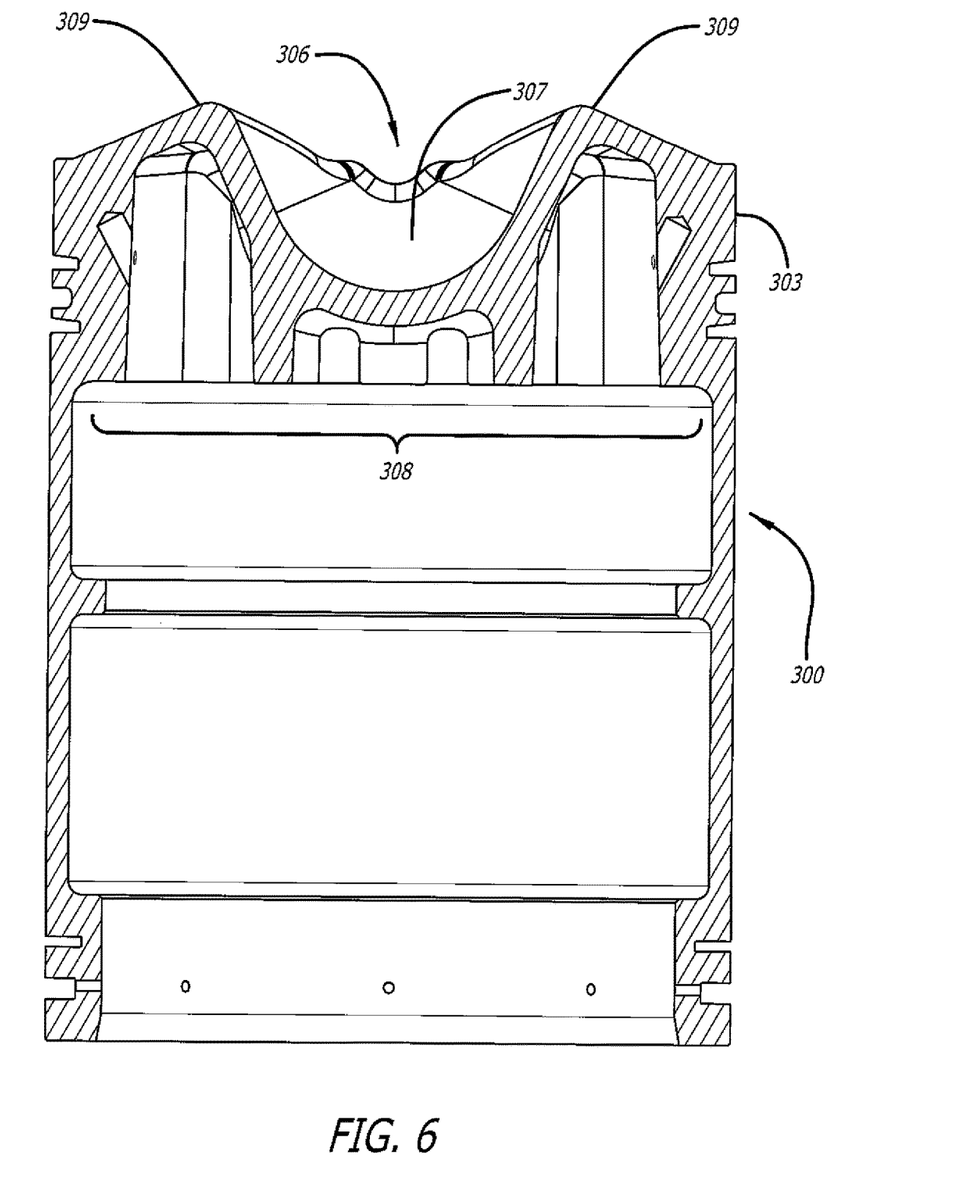
FIG. 6 is a cross-sectional view of the crown and skirt of a piston having a second end surface construction.
Figure 7A:
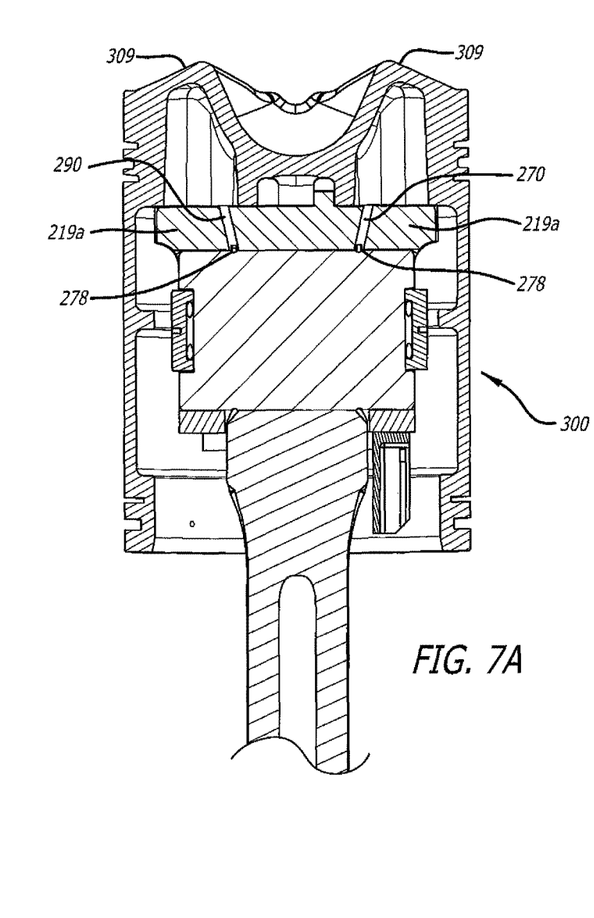
FIG. 7A is a cross-sectional view showing the piston of FIG. 6 assembled to a bearing with a first variation of the first cooling jet outlet construction.
Figure 7B:
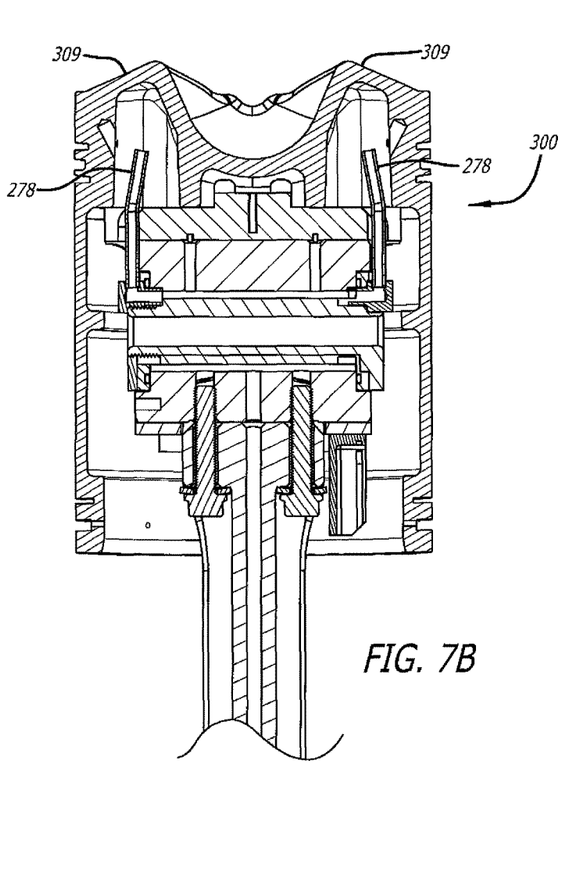
FIG. 7B is a cross-sectional view showing the piston of FIG. 6 assembled to a bearing with a variation of the second cooling jet outlet construction.

In some aspects, it may be desirable to provide more than one cooling jet to the undercrown of a piston with an end surface construction having a more complex contour than that of the piston of FIG. 2. For example, the first combustion chamber construction for an opposed-piston engine described and illustrated in the Applicant's WO2012/158756 includes a piston end surface with two opposing ridges, each with an associated hot spot. Such a piston is shown in FIG. 6, in which the piston 300 has a crown 303 with an end surface 306 and an undercrown 308. The end surface includes an elongated cleft 307 extending in a diametrical direction of the piston 300, defined between opposing ridges 309. As best seen in FIGS. 7A and 7B, the undercrown 308 includes annular and central cooling galleries and the piston includes a bearing structure identical to that of the bearing 217 of FIG. 4, except that the first and second cooling jet embodiments include two jet outlets each, with each cooling jet outlet aimed at a respective hot spot portion of the undercrown.

Central Gallery Cooling

Figure 8:
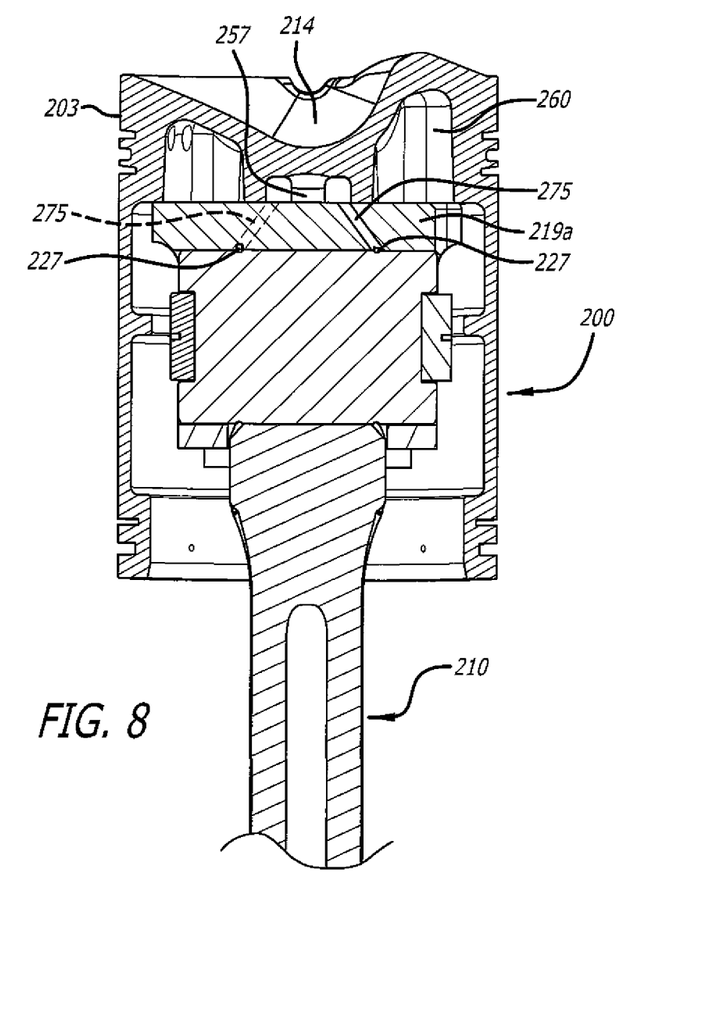
FIG. 8 is a cross-sectional view of the piston/connecting rod assembly taken along lines A-A of FIG. 2 showing a cooling jet outlet construction for delivering one or more cooling jets to a central gallery of the piston.

Referring to FIGS. 3 and 8, in some aspects, it may be desirable to cool the undercrown 208 of the piston 200 by flow of lubricating oil to and through the central gallery 257. In such cases, a cooling jet outlet embodiment is constituted of a passage 275 drilled or formed in the bearing support member 219a. One end of the passage 275 is in fluid communication with the oil reservoir via an oiling groove 227. When pressurized oil received in the reservoir enters the oiling grooves 227, a portion of it flows into the passage 275 whence it is emitted in the form of a coolant jet. The passage 275 is located and oriented so as to be aimed at the central gallery 257. As a result, the coolant jet is directed toward a portion of the crown 203 that is associated with the deepest portion of the bowl 214. Lacking relative movement between the member 219a and the undercrown 208, the jet emitted from the passage is stationary with respect to the undercrown 208. In some aspects it may be desirable to direct more than one coolant jet into the central gallery 257; this is provided by the second passage 275 indicated by the dotted line in FIG. 8. With reference to FIGS. 6 and 7A, it should be evident that the same provisions may be made to the piston 300 so as to enable one or more cooling jest of lubricating oil to be injected into the central cooling gallery of the crown 303, which would delivery of liquid coolant to the part of the undersurface that underlies the deepest portion of the cleft 307.

Method of Operating an Opposed-Piston Engine

With reference to the figures, an opposed-piston engine such as the engine 49 includes at least one cylinder 50 and a pair of pistons 200 equipped with bearing constructions as described herein. The pistons are disposed in opposition to one another in a bore 52 of the cylinder, and each piston is connected to a respective connecting rod 210 by a bearing 217. The engine is operated by a method that includes providing a flow of pressurized oil to each bearing 217. The flow of pressurized oil to each bearing 217 is received in a wristpin 222 of the bearing. In response to pressurized oil in the wristpins, multiple streams of the received, pressurized oil from each wristpin are provided to lubricate a respective bearing interface, and at least one jet of the received, pressurized oil is provided from one of a fixed part and a moving part of each bearing, in which each jet is aimed at a respective piston undercrown portion. In the method, the flow of pressurized oil is received in an oil reservoir in the wristpin. In the method, providing a jet from a moving part of each bearing includes providing the jet from a wristpin. In the method, providing a jet from a moving part of each bearing includes sweeping the jet across the respective piston undercrown portion.

The cooling construction embodiments that are described herein, and the devices and methods with which they are implemented, are illustrative and are not intended to be limiting.

The invention claimed is:

1. A piston cooling configuration for an opposed-piston engine, comprising:
  a piston with a crown having an end surface shaped to form a combustion chamber with an end surface of an opposing piston;
  the crown including an undercrown;
  a bearing mounted in the piston between the undercrown and a small end of a connecting rod;
  the bearing including a wristpin and a bearing surface;
  an oil reservoir in the wristpin in fluid communication with one or more wristpin oil outlet passages positioned to pass oil through the wristpin into a lubrication interface between the wristpin and the bearing surface;
  at least one oiling groove in the bearing surface which is in fluid communication with a wristpin oil outlet passage of the oil reservoir;
  a wristpin oil inlet passage in fluid communication with the reservoir; and,
  at least one cooling jet outlet in a part of the bearing that does not move relative to the undercrown;
  in which the cooling jet outlet is in fluid communication with the oil reservoir via the at least one oiling groove and is aimed toward an undercrown portion, further in which the oil reservoir is an annular recess with opposing ends and has an axis that corresponds to an axis on which the wristpin oscillates.

2. The piston cooling configuration of claim 1, in which the wristpin is received on the small end of the connecting rod.

3. The piston cooling configuration of claim 2, in which:
  the part of the bearing that does not move relative to the undercrown includes a bearing member supporting the wristpin for rotatable oscillation with respect to the undercrown in response to movement of the piston; and,
  the cooling jet outlet includes an oil outlet passage in the bearing member.

4. The piston cooling configuration of claim 3, in which:
  the connecting rod includes an oil passage in fluid communication with the wristpin oil inlet passage; and,
  the oil outlet passage in the bearing member receives pressurized oil from the at least one oiling groove.

5. The piston cooling configuration of claim 4, in which the wristpin and the bearing surface form a biaxial bearing.

6. An opposed-piston engine including at least one cylinder with longitudinally-separated exhaust and intake ports, a pair of pistons disposed in opposition to one another in a bore of the cylinder, and a pair of connecting rods, in which each piston is coupled to a respective connecting rod by a bearing, and at least one piston includes a piston cooling configuration according to any one of the preceding claims.

* * * * *

UNITED STATES PATENT AND TRADEMARK OFFICE
CERTIFICATE OF CORRECTION

PATENT NO. : 10,208,704 B2  
APPLICATION NO. : 15/121527  
DATED : February 19, 2019  
INVENTOR(S) : Ryan G. Mackenzie Page 1 of 1

It is certified that error appears in the above-identified patent and that said Letters Patent is hereby corrected as shown below:

In the Specification

-- Column 9, Line 28, delete "wristpin 222" and replace with "wristpin 221"

Signed and Sealed this  
Twenty-sixth Day of March, 2019

Andrei Iancu  
*Director of the United States Patent and Trademark Office*